United States Patent [19]
Chaney

[11] Patent Number: 5,852,290
[45] Date of Patent: Dec. 22, 1998

[54] SMART-CARD BASED ACCESS CONTROL SYSTEM WITH IMPROVED SECURITY

[75] Inventor: John William Chaney, Gilroy, Calif.

[73] Assignee: Thomson Consumer Electronics, Inc., Indianapolis, Ind.

[21] Appl. No.: 776,555

[22] PCT Filed: Aug. 4, 1995

[86] PCT No.: PCT/US95/09953

§ 371 Date: Jan. 30, 1997

§ 102(e) Date: Jan. 30, 1997

[87] PCT Pub. No.: WO96/06504

PCT Pub. Date: Feb. 29, 1996

[51] Int. Cl.$^6$ .................................................... G06K 19/06
[52] U.S. Cl. .............................. 235/492; 235/380; 902/2; 902/26
[58] Field of Search ...................................... 235/492, 380, 235/382, 451, 377; 902/2, 25, 26, 28

[56] References Cited

U.S. PATENT DOCUMENTS

| | | | |
|---|---|---|---|
| 4,509,210 | 4/1985 | Kohn ........................................ | 455/349 |
| 4,599,647 | 7/1986 | George et al. ........................... | 358/122 |
| 4,685,131 | 8/1987 | Horne ....................................... | 380/20 |
| 4,694,491 | 9/1987 | Horne et al. .............................. | 380/20 |
| 4,739,510 | 4/1988 | Jeffers et al. ............................. | 380/15 |
| 4,803,725 | 2/1989 | Horne et al. .............................. | 380/44 |
| 4,816,653 | 3/1989 | Anderl et al. ............................ | 235/380 |
| 4,816,654 | 3/1989 | Anderl et al. ............................ | 235/380 |
| 4,829,569 | 5/1989 | Seth-Smith et al. ...................... | 380/10 |
| 4,841,133 | 6/1989 | Gercekci et al. ......................... | 235/492 |
| 4,864,614 | 9/1989 | Crowther ................................. | 380/10 |
| 4,866,770 | 9/1989 | Seth-Smith et al. ...................... | 380/20 |
| 4,882,474 | 11/1989 | Anderl et al. ............................ | 235/380 |

(List continued on next page.)

FOREIGN PATENT DOCUMENTS

| | | |
|---|---|---|
| 428252 | 5/1991 | European Pat. Off. . |
| 562295 | 9/1993 | European Pat. Off. . |
| 585833 | 3/1994 | European Pat. Off. . |
| 588184 | 3/1994 | European Pat. Off. . |

OTHER PUBLICATIONS

International Standard, ISO 7816–1 "Identification Cards–Integrated Circuit(s) Cards With Contacts" Part 1: Physical characteristics, Jul. 1987.

International Standard, ISO 7816–2 "Identification Cards–Integrated Circuit(s) Cards With Contacts" Part 2: Dimensions and location of the contacts, May 1988.

International Standard, ISO 7816–3 "Identification Cards–Integrated Circuits(s) Cards With Contacts" Part 3: Electronic signals and transmission protocols, Sep. 1989.

Article: National Plays Encryption Card Jan. 17, 1994, Elec. Eng. Times.

Article: Mercury One–1–One Creates Credit–card tie–in, Fletcher Jun. 13, 1994 Electronics.

EIA Standard for Contional Access, Ver. 2.0 Draft Apr. 7, 1994 National Renewable Security Standards Committee.

European Scrambling Systems, Waterford Un. Press, '93, pp. 7–1/7–15 Month Missing.

*Primary Examiner*—Anita Pellman Gross
*Assistant Examiner*—Michael G. Lee
*Attorney, Agent, or Firm*—Joseph S. Tripoli; Peter M. Emanuel; David T. Shoneman

[57] ABSTRACT

A smart card that includes a descrambler for descrambling entitlement information and data provides improved access control by controlling the manner in which the entitlement information portion of the data stream is passed through the smart card. Entitlement data that is descrambled and used in the smart card for functions such as key generation is reinserted in scrambled form in the high speed output data signal from the smart card. A variable delay device is included in the smart card for controlling when scrambled entitlement data is reinserted into the data stream. Varying the delay permits establishing a desired timing relationship between the reinserted data and other data in the data stream that is output from the smart card. For example, scrambled entitlement data in the output data stream can be made to exhibit substantially the same timing relationship to other data that exists in the input data stream.

19 Claims, 8 Drawing Sheets

U.S. PATENT DOCUMENTS

| | | | |
|---|---|---|---|
| 4,887,296 | 12/1989 | Horne | 380/21 |
| 4,890,321 | 12/1989 | Seth-Smith et al. | 380/20 |
| 4,908,834 | 3/1990 | Wiedemer | 380/5 |
| 4,937,866 | 6/1990 | Crowther et al. | 380/20 |
| 4,993,066 | 2/1991 | Jenkins | 380/16 |
| 5,029,207 | 7/1991 | Gammie | 380/10 |
| 5,034,597 | 7/1991 | Atsumi et al. | 235/380 |
| 5,036,537 | 7/1991 | Jeffers et al. | 380/20 |
| 5,060,079 | 10/1991 | Rufus-Isaacs | 358/349 |
| 5,111,504 | 5/1992 | Esserman et al. | 380/21 |
| 5,113,441 | 5/1992 | Harada | 380/15 |
| 5,120,939 | 6/1992 | Claus et al. | 235/382 |
| 5,144,664 | 9/1992 | Esserman et al. | 380/20 |
| 5,149,945 | 9/1992 | Johnson et al. | 235/380 |
| 5,161,187 | 11/1992 | Kaita et al. | 380/15 |
| 5,204,512 | 4/1993 | Ieki et al. | 235/382 |
| 5,224,161 | 6/1993 | Daniel et al. | 380/14 |
| 5,237,610 | 8/1993 | Gammie et al. | 380/10 |
| 5,267,312 | 11/1993 | Thompson et al. | 380/29 |
| 5,272,751 | 12/1993 | Kajita et al. | 380/17 |
| 5,282,249 | 1/1994 | Cohen et al. | 380/23 |
| 5,339,402 | 8/1994 | Ueda | 235/492 X |
| 5,426,701 | 6/1995 | Herrmann et al. | 380/52 |
| 5,461,675 | 10/1995 | Diehl et al. | 380/23 |
| 5,698,837 | 12/1997 | Furuta | 235/492 |
| 5,736,728 | 4/1998 | Matsubara | 235/492 |
| 5,753,902 | 5/1998 | Fujioka | 235/492 |

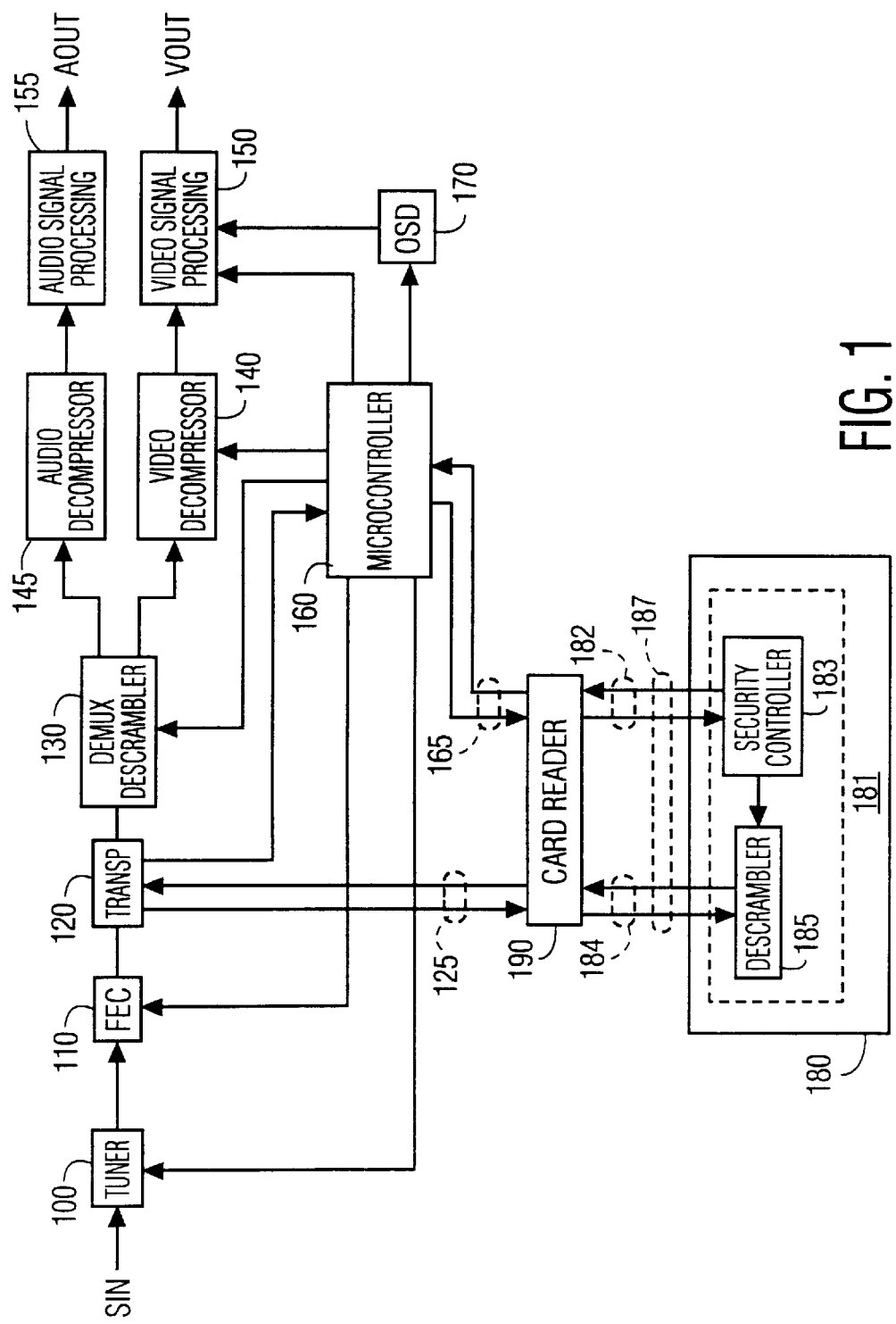

| CONTACT NO. | ASSIGNMENT | CONTACT NO. | ASSIGNMENT |
|---|---|---|---|
| C1 | VCC (SUPPLY VOLTAGE) | C5 | GND (GROUND) |
| C2 | RST (RESET SIGNAL) | C6 | VPP (PROGRAMMING VOLTAGE) |
| C3 | CLK (CLOCK SIGNAL) | C7 | I/O (DATA INPUT/OUTPUT) |
| C4 | RESERVED TO ISO/IEC JTC 1/SC 17 FOR FUTURE USE | C8 | RESERVED TO ISO/IEC JTC 1/SC 17 FOR FUTURE USE |

SMART-CARD BASED ACCESS CONTROL SYSTEM WITH IMPROVED SECURITY

The present invention involves access control systems including an integrated circuit (IC) card, or "smart" card, for limiting access to information in signal processing applications. Systems such as pay-TV systems include access control subsystems that limit access to certain programs or channels. Only users who are entitled (e.g., paid a fee) are permitted to view the programs. One approach to limiting access is to modify the signal by, for example, scrambling or encrypting the signal. Scrambling typically involves modifying the form of the signal using methods such as removing synchronization pulses. Encryption involves modifying a data component included in the signal according to a particular cryptographic algorithm. Only individuals who are entitled to access are given the "key" needed to descramble or decrypt the signal. The terms scrambling and descrambling as used below are intended to encompass access control techniques in general, including cryptography and scrambling.

Access control systems may include an integrated circuit (IC) card, or "smart" card, feature. A smart card is a plastic card the size of a credit card that has a signal processing IC embedded in the plastic. A smart card is inserted into a card reader that couples signals to and from the IC in the card. International Standards Organization (ISO) standard 7816 establishes specifications for an IC card interface. In particular, ISO standard 7816-2 specifies that the electrical interface to the card will be via eight contacts positioned on the card surface as shown in FIG. 2A. Six of the eight signals at the contact points are defined as VCC (supply voltage), RST (reset signal), CLK (clock signal), GND (ground), VPP (programming voltage for programming memory in the card IC), and I/O (serial data input/output). Two contacts are reserved for future use. The assignment of the signals to the smart card contacts is shown in FIG. 2B.

The IC in a smart card processes data such as security control information as part of an access control protocol. The IC includes a control microcomputer, such as the 6805 processor from Motorola Semiconductor, Austin, Tex., which includes ROM, EEPROM, and RAM memory. The processor performs various security control functions including entitlement management and generating the key for descrambling the scrambled data component of the signal.

Entitlement management involves modifying information stored in the card that specifies the card owner's entitlements (i.e. programs and services that a user is entitled to access). The processor adds and deletes entitlements in response to entitlement information in entitlement management messages (EMM) that are included in the input signal. EMM data typically indicates entitlement to a particular service, e.g. all programming on a particular channel, or to a particular program offered by a service, e.g., one movie on a particular channel. Because EMM relates to relatively long term entitlement, EMM typically occurs infrequently in a signal.

Once entitled to a service or program, descrambling of the service or program can occur only after generating a descrambling key. Key generation occurs in response to entitlement control messages (ECM) that are also included in the input signal. ECM provides initialization data for key generation routines that are executed by the processor. Each time a service provider changes the scrambling key, ECM data is included in the signal so that a system entitled to access can generate the corresponding new descrambling key. To aid in preventing unauthorized access to scrambled signals, the key is changed frequently, e.g., every two seconds. Thus, ECM data occurs frequently in the signal.

EMM and ECM data is transferred to the smart card for processing via the serial I/O terminal of the ISO standard 7816 interface. The serial I/O terminal is also used to transfer the generated key from the card to a descrambler unit in the video signal processing channel. The descrambler descrambles the data component of the input signal, e.g. video and audio data, using the key to produce a descrambled, or "plaintext", output signal. Descrambling involves reversing the effects of the scrambling process, e.g., re-inserting sync pulses or decrypting data using the inverse of the encryption algorithm. The descrambled signal is processed further by the signal processing channel to produce video and audio signals suitable for coupling to output devices such as a kinescope and a loudspeaker, respectively.

Including a descrambling function in the video signal processing channel involves adding descrambling hardware to the system. The hardware may be included in a consumer electronics (CE) device, such as a television receiver, or may be in a stand-alone decoder unit, such as a cable box. Including descrambling hardware in a CE device or separate decoder unit dedicates the device to a particular access control system. For example, the hardware may be appropriate for descrambling only a particular type of scrambling algorithm. If the service provider decides to change to a different access control system, e.g. due to security problems, replacing the descrambling hardware involves the expensive and difficult task of modifying CE devices and/or replacing decoder units.

In addition, transferring data between a smart card and the system using the smart card provides an opportunity for a hacker to attack the security system. Because the security control IC is embedded in the smart card, a hacker cannot access the IC directly as part of an attempt to "hack", i.e. defeat, the security algorithm. Attempting to de-laminate the smart card to access the IC will destroy the IC. However, a hacker can monitor a transfer of data between a smart card and other parts of the system. By monitoring a data transfer, a hacker might intercept key data being transferred to an external descrambler, thereby compromising the access control system. Similarly, a hacker can monitor a transfer of entitlement data to and from the smart card. By detecting changes between entitlement data being input to a smart card and entitlement information being output from a smart card, a hacker might obtain information regarding the access control algorithm that is being used in the smart card.

The invention resides, in part, in recognition of the described problems and, in part, in providing a solution to the problems. In accordance with an aspect of the invention, a smart card processes first and second signal components of an input signal to produce corresponding first and second processed signals. The second processed signal is combined with the first signal component of the input signal to produce an output signal from the smart card.

In accordance with another aspect of the invention, the first signal component of the input signal is combined with the second processed signal to produce a predetermined timing relationship between the first signal component and the second processed component in the output signal.

In accordance with another aspect of the invention, the first signal component of the input signal is delayed before being combined with the second processed signal such that the output signal exhibits the predetermined timing relationship.

In accordance with another aspect of the invention, the predetermined timing relationship is substantially the same as a timing relationship that exists between the first and second signal components of the input signal.

In accordance with another aspect of the invention, the first signal component of the input signal is delayed through a first-in-first-out memory device included in the smart card prior to being combined with the second processed signal.

In accordance with another aspect of the invention, the first and second signal components of the input signal include scrambled information. The first and second processed signals include descrambled information corresponding to the scrambled information in the first and second signal components of the input signal.

In accordance with another aspect of the invention, the first signal component of the input signal comprises scrambled entitlement data for a pay-for-access-service, such as a pay TV channel, and the second signal component of the input signal comprises scrambled data provided by the pay-for-access service provider, such as scrambled video or audio data.

The invention may be better understood by referring to the accompanying drawing in which:

FIG. 1 shows, in block diagram form, a signal processing system including a smart card that provides both entitlement processing and descrambling;

Figures 2A, 2B:
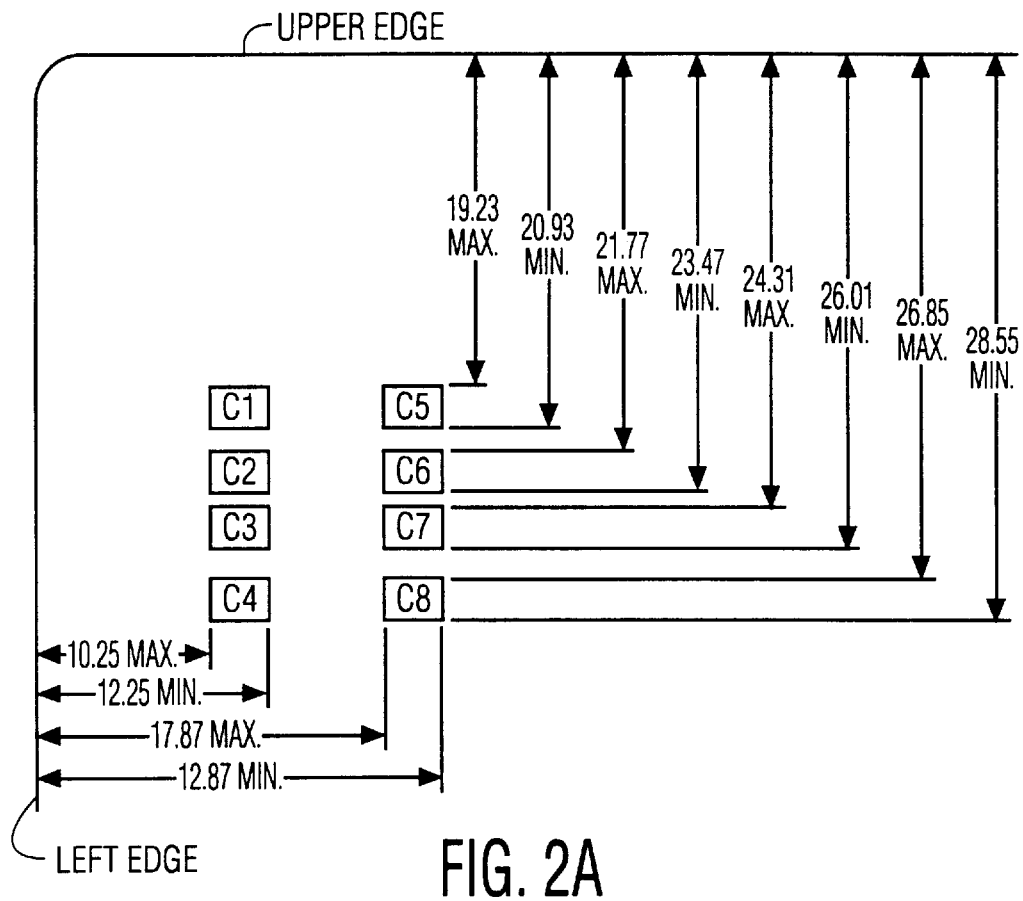
FIG. 2A shows the location of signal contacts on the surface of a smart card in accordance with ISO standard 7816-2.
FIG. 2B shows the assignment of smart card interface signals to signal contacts shown in FIG. 2A in accordance with ISO standard 7816-2.

An embodiment of a smart card access control system including the invention will be described in reference to an exemplary video signal processing system that is shown in block diagram form in FIG. 1. The system shown in FIG. 1 includes signal processing functions that may be found in various signal processing systems. A specific example is the DSS® direct-broadcast satellite television system developed by Thomson Consumer Electronics, Inc.

For a pay-TV service that involves a smart card based access control system, a user wishing to purchase the service contacts the service provider, pays a service-access fee and receives a smart card. A card is issued to a user with initial entitlement information stored in the card's EEPROM. Entitlement information may include data identifying the user and data specifying the scope of initial access entitlement (e.g., duration and/or specific programs the user has paid for). In addition, application-specific key generation software is stored in the card memory.

Entitlement information stored in the card can be modified by the service provider from a remote location using entitlement management messages (EMM) and entitlement control messages (ECM) that are inserted into portions of the signal. EMM includes information indicating subscription (long term access) and pay-per-view (single program access) services that the user has paid for. EMM may be directed to a particular smart card by including identification information in EMM data that corresponds to the identification information stored in the particular smart card. ECM includes data such as initialization data needed to generate descrambling keys. Thus, a signal for a particular program includes both a scrambled data component comprising video and audio data, and a control information component comprising EMM and ECM.

When the user wishes to access a pay-TV service, smart card 180 in FIG. 1 is inserted into card reader 190. Card reader 190 couples signals between smart card 180 and a signal processing channel comprising units 100 through 170 in FIG. 1. More specifically, card reader 190 connects to eight terminals that are located on the surface of smart card 180 as specified in ISO standard 7816-2 (see FIG. 2). The connection established by card reader 190 creates interface 187 between smart card 180 and the signal processing channel. In accordance with an aspect of the invention described further below, the eight signals in interface 187 include signals 184, a high speed data input/output (I/O) port for smart card 180, and signals 182, a subset of the ISO standard IC card interface signals.

The desired program or service is selected by tuning the receiver to the appropriate channel using tuner 100. Tuner 100 is controlled by microcontroller 160 in response to user inputs. For example, microcontroller 160 may receive channel selection signals from a remote control (not shown in FIG. 1) activated by a user. In response to the channel selection signals, microcontroller 160 generates control signals causing tuner 100 to tune the selected channel.

The output of tuner 100 is coupled to forward error corrector (FEC) 110. FEC 110 monitors error control information, such as parity bits in the tuned signal, to detect errors and, depending on the error control protocol, to correct errors. Microcontroller 160 is coupled to FEC 110 to monitor the occurrence of errors in the signal and control the processing of errors. FEC 110 also performs an analog-to-digital conversion (ADC) function to convert the analog output of tuner 100 to a digital signal at the output of FEC 110.

Figure 3:
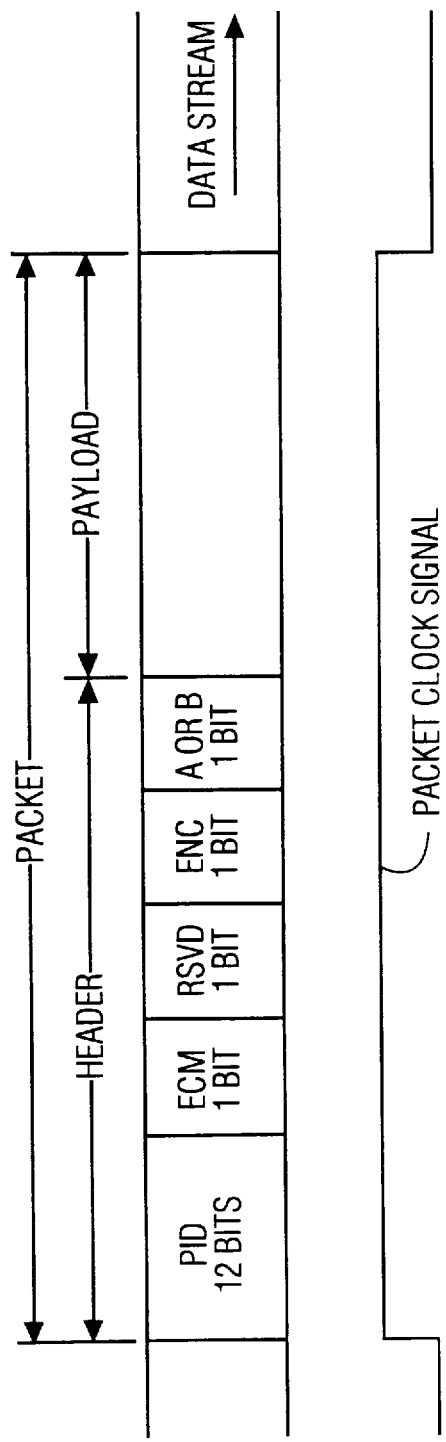
FIG. 3B shows a format that data included in a signal processed by the system shown in FIG. 1 may exhibit.

Transport unit 120 processes the signal from FEC 110 to detect and separate various types of data in the tuned signal. The data in the signal may be arranged in various formats. FIG. 3 shows an exemplary data format that serves as the basis for the following description. The signal depicted in FIG. 3 comprises a stream of data organized in packets of data bytes, i.e. "packetized" data. Each packet is associated with a particular type, or sub-stream, of information in the tuned channel's data stream. For example, the signal includes packets of program-guide information, control information (e.g., ECM or EMM), video information, and audio information. The sub-stream that a particular packet is associated with is defined by data included in a header portion of each packet. A payload portion of each packet includes the packet data. The exemplary data format shown in FIG. 3 includes two bytes (16 bits) of data in the header and 186 bytes of data in the payload.

The first twelve bits of the header in each packet are program identification (PID) data bits. PID data identifies the data substream that the payload data is associated with. An example of the information provided by PID data follows:

TABLE 1

| PID Value | Payload contents |
|---|---|
| 1 | program-guide information |
| 4 | EMM |
| 10 | video data for channel 101 |
| 11 | audio data for channel 101. |

Other PID values identify video and audio data for other channels.

As part of the tuning process, microcontroller 160 refers to a PID "map" stored in the microcontroller's memory to determine the PID values associated with the tuned channel. The appropriate PID values are loaded into PID registers in transport unit 120. For example, when channel 101 is selected, microcontroller 160 accesses the stored PID map, determines that video data and audio data for channel 101 are associated with PID values of 10 and 11, respectively, and loads the values 10 and 11 into respective video and audio PID registers in transport unit 120. The PID data in incoming packets is compared to the PID values stored in the PID registers to determine the content of the payload of each packet. Microcontroller 160 can update the PID map data in response to PID-to-channel correspondence information in "program guide" packets (PID value of 1).

The last four bits of the header portion of each packet further define the payload contents as follows:

TABLE 2

| Header bit | Designation | Function |
| --- | --- | --- |
| 13 | ECM flag | indicates if payload is ECM |
| 14 | — | reserved |
| 15 | ENC flag | indicates if payload is encrypted |
| 16 | Key flag | indicates whether payload key is key A or key B. |

The ECM flag being active, e.g., at logic 1, indicates that the payload includes ECM data such as initialization data for key generation. The ENC flag being active indicates that the payload is encrypted and, therefore, must be descrambled. The key flag determines which one of two keys, key A or key B, should be used for descrambling the payload (e.g., logic 0 indicates key A, logic 1 indicates key B). Use of the key flag is described below in regard to FIG. 7.

Transport unit 120 in FIG. 1 extracts and processes the header data in response to a packet clock signal shown in FIG. 3. The packet clock signal is generated and synchronized to the data stream by FEC 110. Each transition of the packet clock signal indicates the beginning of a packet. Transport unit 120 processes the 16 bits of header data following each packet clock signal transition to determine the destination for the packet payload. For example, transport unit 120 transfers payloads containing EMM (PID value of 4) and ECM to security controller 183 in smart card 180 via microcontroller 160. Video and audio data are directed to demux/descrambler 130 for descrambling and demultiplexing into video and audio signals. Program guide data (PID value of 1) is directed to microcontroller 160 for PID map updating.

Security controller 183 processes EMM and ECM data to provide access control functions including entitlement management and key generation. Security controller 183 is included in integrated circuit (IC) 181 and comprises a microprocessor such as the 6805 processor from Motorola. Entitlement management involves processing EMM data to determine how and when entitlement information stored in IC 181 is to be updated, i.e. adding and deleting entitlements. ECM data provides initial values needed for security controller 183 to generate descrambling keys. After being generated by security controller 183, a key is transferred via microcontroller 160 to descrambler 130 where the scrambled data component of the input signal, e.g., the video and audio program data, from the tuned channel is descrambled. In accordance with principles of the invention that are described further below, the descrambling function may also be provided by descrambler 185 included in IC 181.

Descrambled video and audio data is decompressed in video decompressor 140 and audio decompressor 145, respectively. Program data is compressed at the program source using any one of a variety of known data compression algorithms. Decompressors 140 and 145 reverse the effects of the compression algorithm.

The outputs of video and audio decompressors 140 and 145 are coupled to respective video and audio signal processors 150 and 155. Audio signal processor 155 may include functions such as stereo signal generation and digital to analog conversion for converting the digital output signal from decompressor 145 to an analog audio output signal AOUT from processor 155 that can be coupled to a loudspeaker (not shown in FIG. 1). Video signal processor 150 also includes digital to analog conversion capability to convert the digital output of decompressor 140 to an analog video output signal VOUT that is suitable for display on a display device such as a kinescope. Video processor 150 also provides signal switching necessary to include an on-screen display (OSD) signal, produced by OSD processor 170, in signal VOUT. The OSD signal represents, for example, graphics information such as a channel number display that is to be included in the displayed image. Video switches in video processor 150 multiplex the OSD signal into signal VOUT as required to produce the desired display. The operation of OSD processor 170 is controlled by microcontroller 160.

Figure 4:
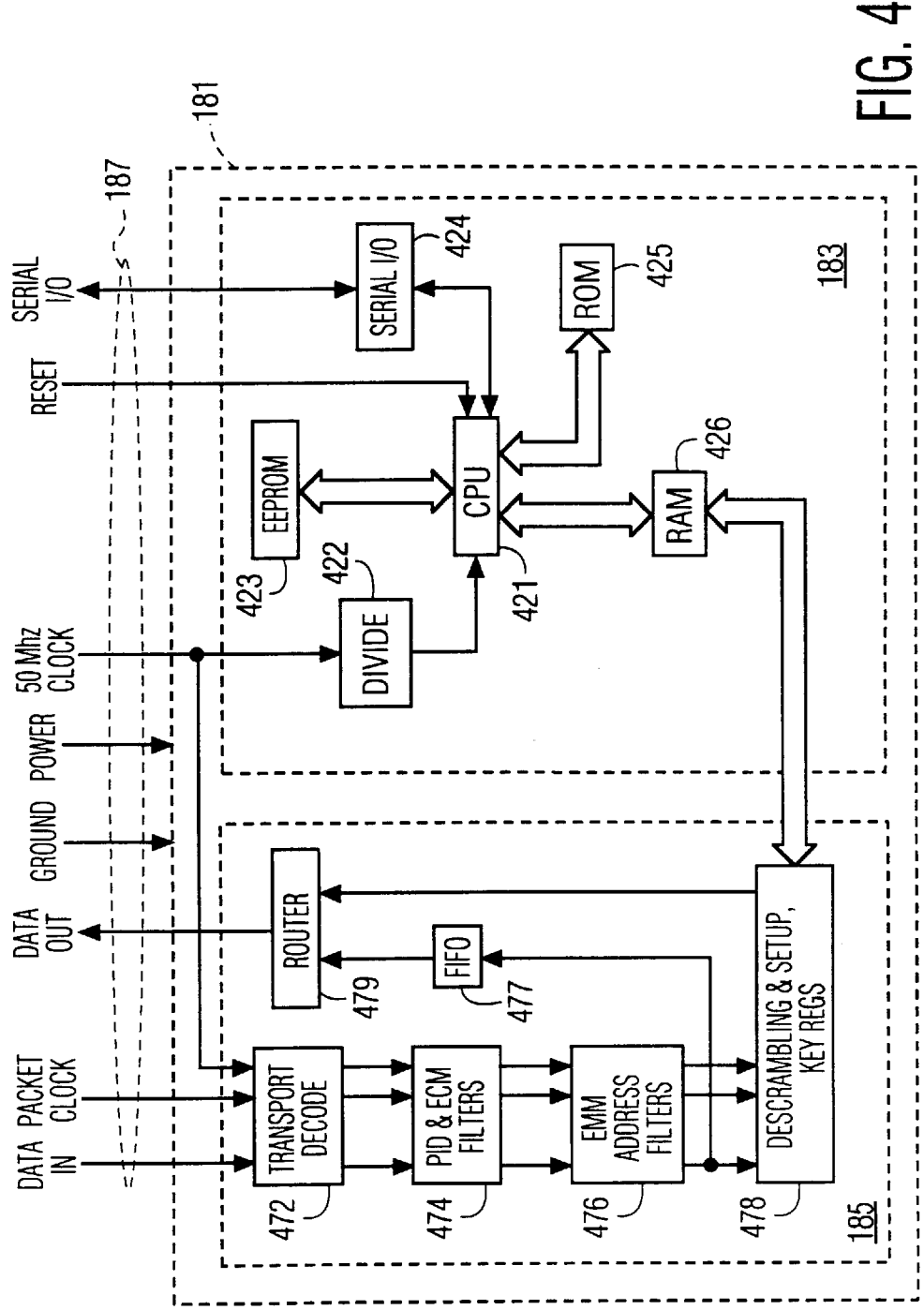
FIG. 4 shows, in block diagram form, an embodiment of signal processing functions included in a smart card suitable for use with the system shown in FIG. 1.

Returning to the access control features of the system shown in FIG. 1, the features and function of smart card 180 may be better understood by referring to the block diagram of smart card IC 181 that is shown in FIG. 4. Reference numerals in FIG. 4 that are the same as in FIG. 1 indicate the same or similar features. In FIG. 4, integrated circuit (IC) 181 includes security controller 183 comprising a central processing unit (CPU) 421, RAM 426, ROM 425, EEPROM 423 and serial I/O unit 424. CPU 421 is a processor such as the 6805 from Motorola. Key generation and entitlement management software is stored in ROM 425 and EEPROM 423.

Data specifying current entitlements is also stored in EEPROM 423 and is modified in response to information in entitlement management messages (EMM) in the received signal. When an EMM packet is detected by transport processor 120 in FIG. 1 (packet PID value of 4), microcontroller 160 in FIG. 1 transfers the packet payload to security controller 183 via serial I/O unit 424. CPU 421 transfers the EMM data in the payload to RAM 426. CPU 421 processes the EMM data and modifies entitlement data stored in EEPROM 423 accordingly.

Packet payloads that include entitlement control messages (ECM), as indicated by the ECM flag in the packet header being active, are transferred from transport unit 120 to security controller 183 via microcontroller 160 and serial I/O unit 424.

Any type of packet, e.g., EMM, video, or audio, may include ECM. ECM data is used for generating the descrambling key for a particular type of data. For example, ECM data in an EMM packet is used to generate an EMM descrambling key. When transferred to security controller 183, ECM data is stored in RAM 426 until processed by CPU 421. Key generation software stored in EEPROM 423 and ROM 425 is executed by CPU 421 using the ECM data in RAM 426 to generate a particular key. The ECM data provides information such as initial values required by the key generation algorithms. The resulting key is stored in RAM 426 until transferred by CPU 421 to descrambler 130 via serial I/O unit 324 and microcontroller 160.

EMM and ECM data may be encrypted as indicated by encryption flag ENC in the packet header being active. Encrypted data is transferred from transport unit 120 to descrambler 130 for descrambling before being transferred to security controller 183 for entitlement management or key generation processing.

The features and operation of IC 181 that have been described are typical of known smart card systems but having no descrambler therein (i.e., within the smart card). As stated above, however, using a descrambling unit external to a smart card, such as descrambler 130, substantially degrades system security and makes changing descrambling hardware undesirable. The arrangement shown in FIGS. 1 and 4 includes features that significantly improve security in comparison to known smart card systems. In particular, IC 181 of smart card 180 includes descrambler unit 185 and high data rate synchronous interface 184 comprising separate serial data in and serial data out lines. The combination of descrambler 185 and interface 184 makes it possible for all access control processing to occur within smart card 180.

In FIG. 1, card reader 190 couples both ISO standard interface signals 165 from microcontroller 160 and high speed interface signals 125 from transport unit 120 to smart card 180 via portions of smart card interface 187 that are labeled 182 and 184, respectively. FIG. 4 shows the signals included in interface 187. ISO standard signals 182 comprise power, ground, reset, and serial I/O in FIG. 4 (correspond to VCC, GND, RST, and I/O in FIG. 2B). High speed interface signals 184 comprise high speed data-in and data-out signals, a packet clock signal, and a high frequency (e.g. 50 MHz) clock signal. ISO standard signal VPP (programming voltage) is replaced by the packet clock signal allowing interface 187, including both high and low speed interfaces, to be implemented using the ISO standard configuration of eight contacts that is shown in FIG. 2A.

Eliminating signal VPP does not preclude the system shown in FIG. 1 from operating with existing ISO standard smart cards that do not include descrambler 185 and high speed data interface 184. Existing smart cards typically include EEPROM circuits that do not require a separate programming voltage. A "charge pump" feature generates the required programming voltage from the card supply voltage when programming is required. Thus, the VPP signal as specified by the ISO standard is an "unused" terminal for most existing ISO standard smart cards. Use of the system with existing smart cards does require modifying the operation of the system such that high speed interface 184 and descrambler 185 are not used. The required modification can be achieved by changing only the control software for controller 160.

Descrambler 185 operates at a high data rate in response to the high frequency clock signal while security controller 183 requires a lower frequency clock signal. Divider 422 in IC 181 divides the 50 MHz clock signal to produce a lower frequency clock signal suitable for security controller 183. Thus, the single high frequency clock signal serves as a timing signal for controlling the operation of both security controller 183 and descrambler 185. Using divider 422 avoids dedicating two of the eight smart card interface signals to separate high and low frequency clock signals.

Descrambler 185 includes transport decode unit 472, PID & ECM filter unit 474 and EMM address filter unit 476 for providing functions similar to the above-described functions of transport unit 120 in FIG. 1. The high speed data-in and data-out signals of interface 187 couple the high speed data stream of the input signal between transport unit 120 and descrambler 185. Including functions of transport unit 120 within smart card 180 enables smart card 180 to process incoming data packets at the high data rate of the input signal. Both the data-in and packet clock signals are coupled to unit 472.

In response to each transition in the packet clock signal, unit 472 processes the 16 bits of header data. The first 12 bits of the header are program identification (PID) data that are directed to PID & ECM filter unit 474. Unit 474 compares the packet's PID data to PID values stored in unit 474 for each type of packet included in the tuned channel. Similarly to the above-described operation of transport unit 120 (see Table 1 above and associated description), PID comparison in unit 474 determines what type of data the payload contains, e.g., program guide, EMM, video, or audio. PID values identifying packet types in the currently tuned signal are stored in registers in unit 474. The registers are loaded as part of the above-described tuning process for the system in FIG. 1. More specifically, microcontroller 160 accesses a stored PID "map" as described above and transfers PID values associated with the currently tuned channel to registers in unit 474 via signals 182 and security controller 183 in smart card 180. Transfer of data between security controller 183 and functions of descrambler 185, such as unit 474, occurs via a data bus internal to IC 181 that is not shown in FIG. 4.

How the payload data is processed by smart card 180 is determined both by the results of PID comparison in unit 474 and by the contents of bits 13 to 16 of the packet header extracted by unit 472. Using the example above relating to channel 101 (see Table 1), PID data identifies: program guide data (PID=1) that microcontroller 160 processes to update the PID map, EMM data (PID=4) that security controller 183 processes to modify entitlements, video data (PID=10) and audio data (PID=11). Bits 13 through 16 of the header control security-related operations (see Table 2 above and the associated description) in smart card 180. If bit 13 (ECM flag) is active, the payload includes ECM data that requires key generation processing by security controller 183. If bit 15 (ENC flag) is active, the payload is encrypted and is descrambled in descrambling unit 478 within descrambler 185. Bit 16 determines whether key A or key B will be used in unit 478 for descrambling.

The encryption status bit ENC determines how payload data will be processed by descrambling unit 478. Payload data that is not encrypted passes unchanged from the high speed data-in terminal of smart card 180 through descrambling unit 478 to the high speed data-out terminal. Encrypted data is descrambled at the data rate by unit 478. Descrambled video and audio data is passed to the high speed data-out terminal of smart card 180. In each descrambled audio or video packet, the ENC bit in the packet header is set to logic 0 indicating that the packet is "clear", i.e. descrambled.

To ensure that unauthorized users do not access descrambled entitlement or key related data, descrambled EMM or ECM data is not passed out of smart card 180 via the high speed data out terminal. One approach is for the smart card to simply remove the EMM or ECM data component from the data stream at the output of the smart card. However, by monitoring changes that occur to data in the data stream between the data input and output of smart card 180, a hacker could obtain useful information regarding the processing that is occurring in smart card 180. For example, a hacker could assume that information removed from the data stream by the smart card pertains to the service associated with the smart card.

This problem is overcome by passing the original scrambled EMM or ECM control information component, with the ENC bit set to logic 1; through smart card 180 from the high speed data-in terminal to the high speed data-out terminal. More specifically, a first signal component of the input signal, such as scrambled ECM or EMM control information, is processed, e.g., descrambled, by descrambler 478 to produce a first processed signal such as descrambled data needed for key generation. Information such as key information in the first processed signal is used by descrambler 478 to process a second component of the input signal to produce a second processed signal representing, for example, descrambled video or audio data. The first signal component of the input signal is combined with the second processed signal to produce the output data stream from smart card 180. Thus, for example, scrambled entitlement information in the input signal may be descrambled and used by smart card 180, but corresponding data at the output is unchanged, thereby reducing the information that can be obtained by a hacker monitoring the data stream.

To further obscure the nature of processing occurring in smart card 180, the original component of the input signal is delayed before being re-inserted into the output data stream. The delay ensures that the timing relationship between scrambled control information, such as EMM and/or ECM, and descrambled data, such as video and/or audio data, in the data output signal of smart card 180 is substantially the same as the timing relationship between scrambled control information and scrambled data in the data input signal of smart card 180. As a result, it is more difficult for a hacker to determine characteristics of smart card 180 such as the internal descrambling delay by monitoring the data stream.

Original scrambled data is delayed and re-inserted in the data stream via first-in-first-out (FIFO) memory 477 and router 479 in FIG. 4. The input data signal to FIFO 477 is the signal at the data input of descrambler 478. The delay through FIFO 477 can be adjusted by control processor 183 to provide a delay through FIFO 477 that corresponds to the particular descrambling algorithm being executed in descrambler 478. For example, the delay through FIFO 477 can be increased or decreased by storing more or less data, respectively, in the FIFO before beginning to read data from the FIFO. Router 479 combines delayed data from FIFO 477 with descrambled data from descrambler 478 under control of control processor 183 to produce the data output signal from smart card 180. Router 479 may comprise a multiplexer for selectively coupling either the FIFO output or the descrambler output to the data output of smart card 180 in response to a control signal provided by control processor 183.

EMM and ECM data that is descrambled in descrambling unit 478 is stored temporarily in RAM 426 in security controller 183 until processed by security controller 183 for entitlement management and key generation. Transport unit 120 in FIG. 1 receives the data (either unchanged or descrambled) from the high speed data-out terminal of smart card 180. The PID value of each packet is checked and the payload is transferred to the appropriate function in FIG. 1 for further processing (e.g., microcontroller 160 or decompressors 140 and 145).

The operation of smart card 180 is controlled by commands from microcontroller 160 in FIG. 1 that are communicated to smart card 180 via the ISO standard serial interface. In effect, microcontroller 160 is the master processor and security controller 183 is the slave processor. For example, microcontroller 160 transfers PID information to smart card 180 and directs the card to descramble the data in the corresponding data streams. Security controller 183 responds by checking entitlements and configuring smart card 180 for the appropriate type of data processing such as entitlement processing, key generation or descrambling. In addition, microcontroller 160 requests status information such as whether descrambling is in progress. Commands are communicated to security controller 183 in smart card 180 via the serial I/O terminal. Any response required by the command is returned to microcontroller 160 via the serial I/O terminal. Thus, the serial I/O signal serves as a control signal between the system and smart card 180 while the high-speed data interface provides high-speed input and output data signals between the card and the system.

Serial communications between microcontroller 160 and smart card 180 occur according to a protocol provided for in ISO standard 7816-3. A smart card notifies the system of the particular protocol that will be used by sending a protocol type number T to the system. More specifically, when a card is inserted into the card reader, the card reader applies power to the card and resets the card by activating the reset signal. The card responds to the reset signal with an "answer to reset" data sequence specified in ISO standard 7816-3 §6. The answer to reset includes an interface byte TDi. The four least significant of byte TDi define the protocol type number T (see ISO standard 7816-3 §6.1.4.3).

The protocol type for the system shown in FIG. 1 is type T=5. A type 5 protocol is classified as "reserved", i.e. currently undefined, in the ISO standard. For the system in FIG. 1, protocol type 5 is identical to protocol type 0 (an asynchronous half-duplex protocol defined in ISO 7816-3 §8) except for the manner in which the baud rate for serial I/O is determined. Serial I/O at the card interface occurs at a rate determined according to Table 6 in ISO standard 7816-3. The baud rate calculation is based on the rate at which security controller 183 is clocked. For existing smart cards, the clock frequency for security controller 183 is equal to the clock frequency $f_s$ at the card's clock pin. As shown in FIG. 4, smart card 180 includes divider 422 for dividing the rate of the high speed input clock $F_{in}$ by a factor N, i.e. $F_{in}/N$, to establish the clock rate for security controller 183. Thus, for a type 5 protocol, Table 6 of ISO standard 7816-3 is modified by defining $f_s = F_{in}/N$.

As in the case of a type 0 protocol, all commands for a type 5 protocol are initiated by microcontroller 160. A command begins with a five byte header including a one-byte instruction class designation (CLA), a one-byte instruction (INS), a two-byte parameter (P1, P2) such as an address, and a one-byte number (P3) defining the number of data bytes that are part of the command and follow the header. For the system in FIG. 1, parameter P1, P2 is not needed and, therefore, these bytes are "don't cares". Thus, commands take the form:

CLA|INS|-|-|P3|data (P3 bytes).

Commands recognized by smart card 160 include a status command and a PID transfer command. Smart card 160 responds to a status command from microcontroller 160 by providing the processing status of the card, e.g. whether the card has completed key generation or whether the card is descrambling data. Using a PID transfer command, microcontroller 160 transfers PID numbers associated with the tuned channel. Other commands such as commands for transferring EMM and ECM data, key related commands, and "purchase offer" commands are possible and will be explained below.

Figure 5:
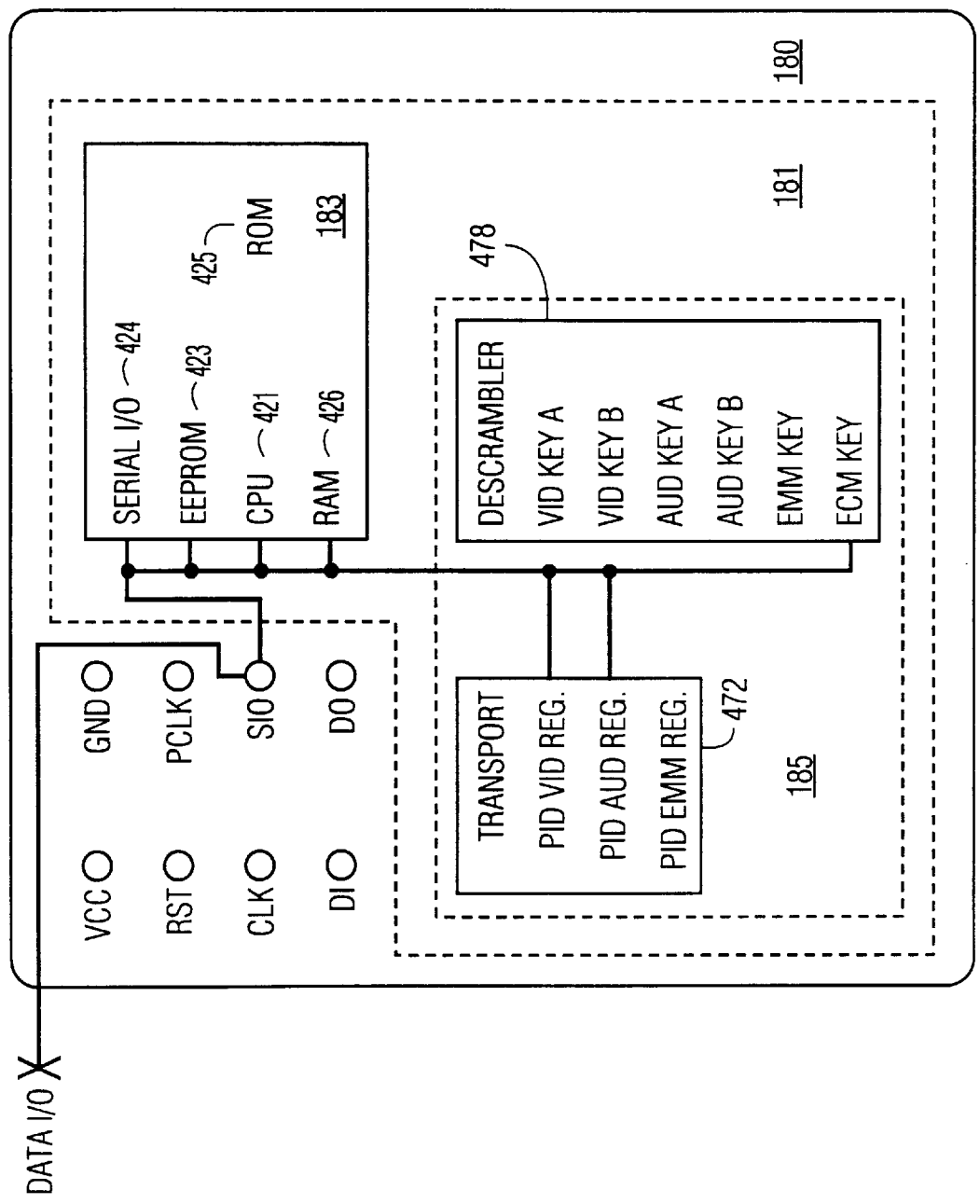
FIG. 5 through 8 illustrate signal routing through the smart card shown in FIG. 4 during various modes of operation of the system shown in FIG. 1.

The operation of smart card 180, and in particular descrambler 185, will now be described in more detail in reference to FIGS. 5 through 8. When a new channel is tuned, microcontroller 160 transfers PID values for the new channel from the PID map to smart card 180 as shown in FIG. 5. The PID data transfer occurs using a PID transfer command including N PID values, where N is specified in byte P3 of the command header. The command and PID values are communicated to the card via the serial data terminal of smart card 180 and serial input/output unit 424. CPU 421 receives the PID data and directs the data to the appropriate PID register in registers 474 in descrambler 185.

Figure 6:
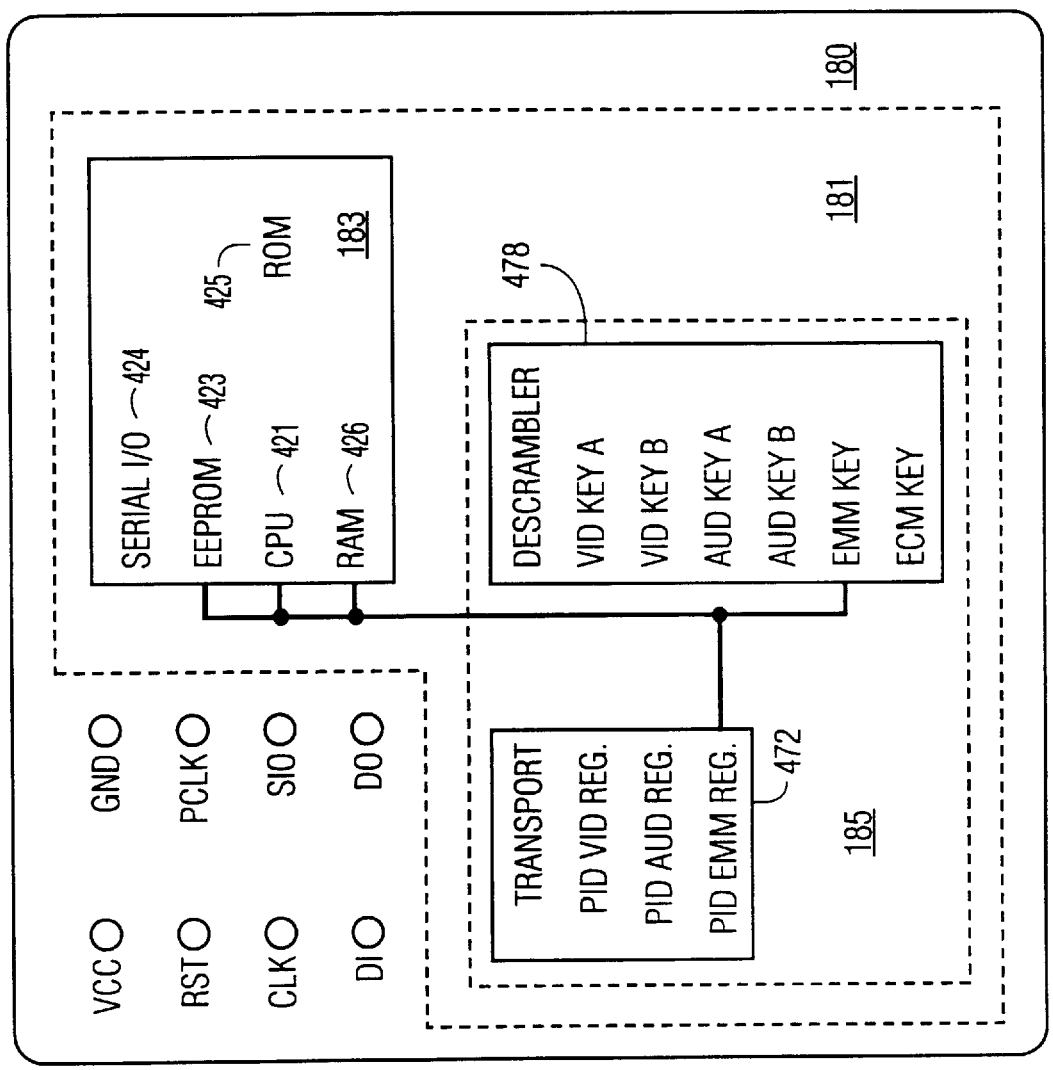

Before a signal can be descrambled, a user must be entitled to access and the correct key must be loaded into descrambler 185. After transfer of the PID data to smart card 180, security controller 183 compares the PID values to entitlement data stored in EEPROM 423 to see if the user is entitled to access the tuned channel. Assuming the user is entitled, the next step is key generation. Key generation involves processing ECM data. Thus, ECM must be received and processed to produce the key before audio and video data can be descrambled. ECM data is encrypted to reduce the likelihood of unauthorized key generation. A card is issued with a key for descrambling ECM stored in the card in EEPROM 423. As illustrated in FIG. 6, the ECM key is transferred by CPU 421 from EEPROM 423 to ECM key registers in descrambling unit 478.

If the user is not entitled to access the tuned channel, entitlements must be received before key generation and descrambling can occur. Entitlements can be received via EMM. An "address" identifying a particular smart card is stored in EMM address unit 476 of the card when the card is issued. By including address information in EMM, a service provider can direct EMM to a particular card. The smart card compares the address information in EMM with the card address stored in unit 476 to detect EMM information directed to the card. If a user is not entitled, security controller 183 configures the card for EMM processing as shown in FIG. 6 in case EMM data is received.

As in the case of the ECM key, a card is issued with an EMM key stored in the card in EEPROM 423. In FIG. 6, the EMM key is transferred from EEPROM 423 to EMM key registers in descrambling unit 478 by CPU 421. Scrambled EMM data from transport unit 120 in FIG. 1 is input to the card via the high speed data-in port. After checking the EMM address in unit 476, EMM data intended for the card is decrypted in descrambling unit 478. Decrypted EMM data is temporarily stored in RAM 426 and processed by CPU 421 to update entitlement data stored in EEPROM 423.

Figure 7:
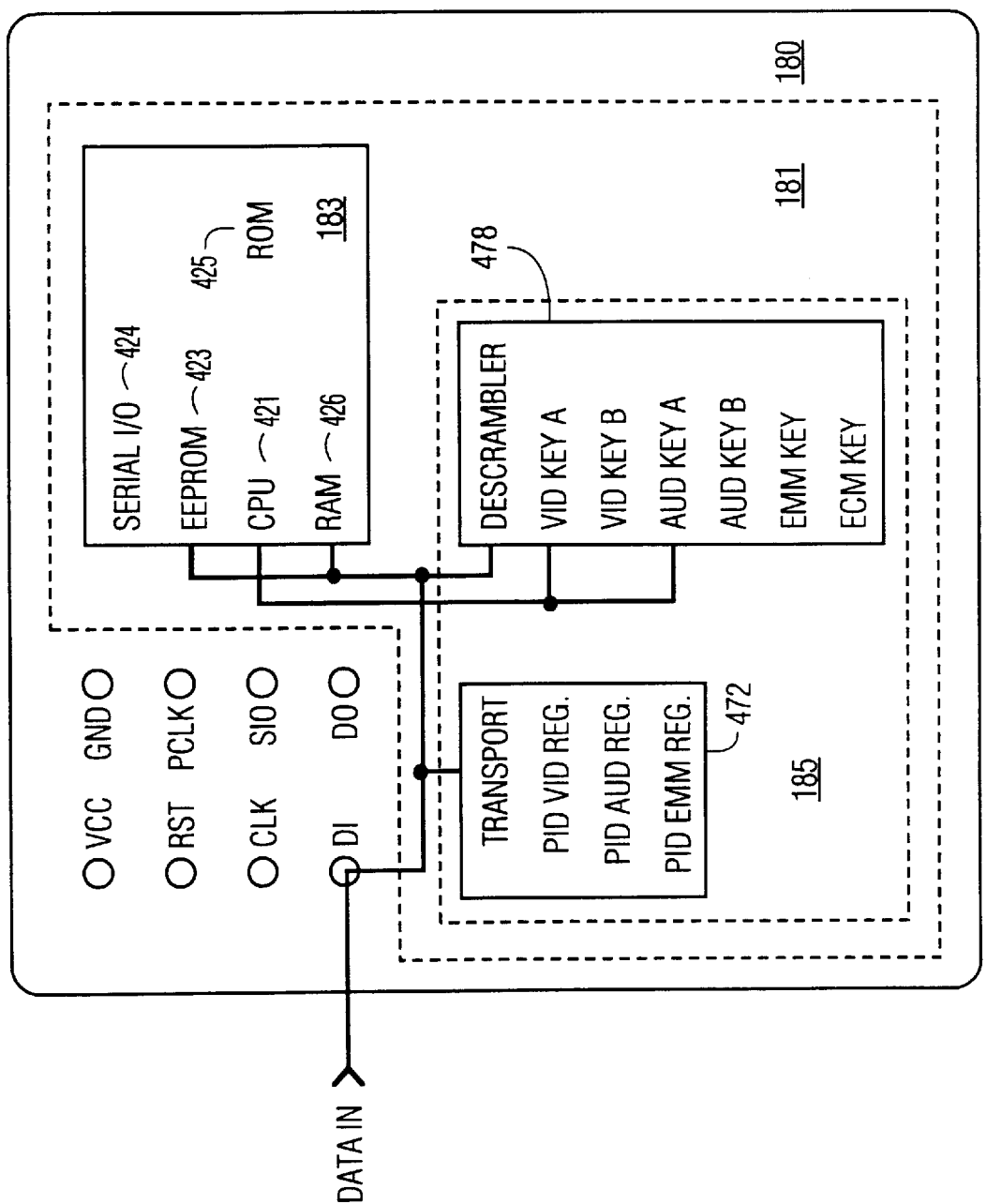

After the PID values are loaded, entitlements exist, and the ECM key is in place in descrambler 185, the card is ready to descramble ECM data and generate the audio and video keys. In FIG. 7, ECM data in the signal is received by smart card 180 via the high speed data-in terminal and detected by transport decode unit 472. The ECM data is directed to descrambler 478 where the previously loaded ECM key is used to decrypt the ECM data. The decrypted ECM data is transferred from descrambler 478 to RAM 424. When decrypted ECM data is available, CPU 421 executes key generation algorithms stored in EEPROM 423 and ROM 425 using the decrypted ECM data in RAM 424 to generate the video and audio keys. The generated keys are transferred to the appropriate video and audio key registers in descrambler 478.

As shown in FIG. 7, descrambler 478 includes two key registers for video, video keys A and B, and two key registers for audio, audio keys A and B. Whether key A or B will be used to descramble a particular packet is determined by the key flag bit in the packet header (see Table 2 above). The "multi-key" feature is used to permit a new key to be generated while an existing key is being used to descramble data. Processing ECM data in security controller 183 to generate a new key and transferring the new key to a key register in descrambler 478 requires a significant number of instruction cycles in CPU 421. If descrambling was halted during the generation and transfer of a new key, the processing delay would require someone viewing a program to watch a scrambled image until the new key was in place in descrambler 478. Having key registers A and B permits data to be decrypted using a key in one key register, e.g., key register A, while a new key is being generated and loaded into the second key register, e.g., key register B. After initiating key generation by transmitting ECM data, a service provider waits for a time period sufficient to ensure that new key B is generated and in descrambler 478 before encrypting packets using key B. The key flag notifies descrambler 185 when to begin using the new key.

Figure 8:
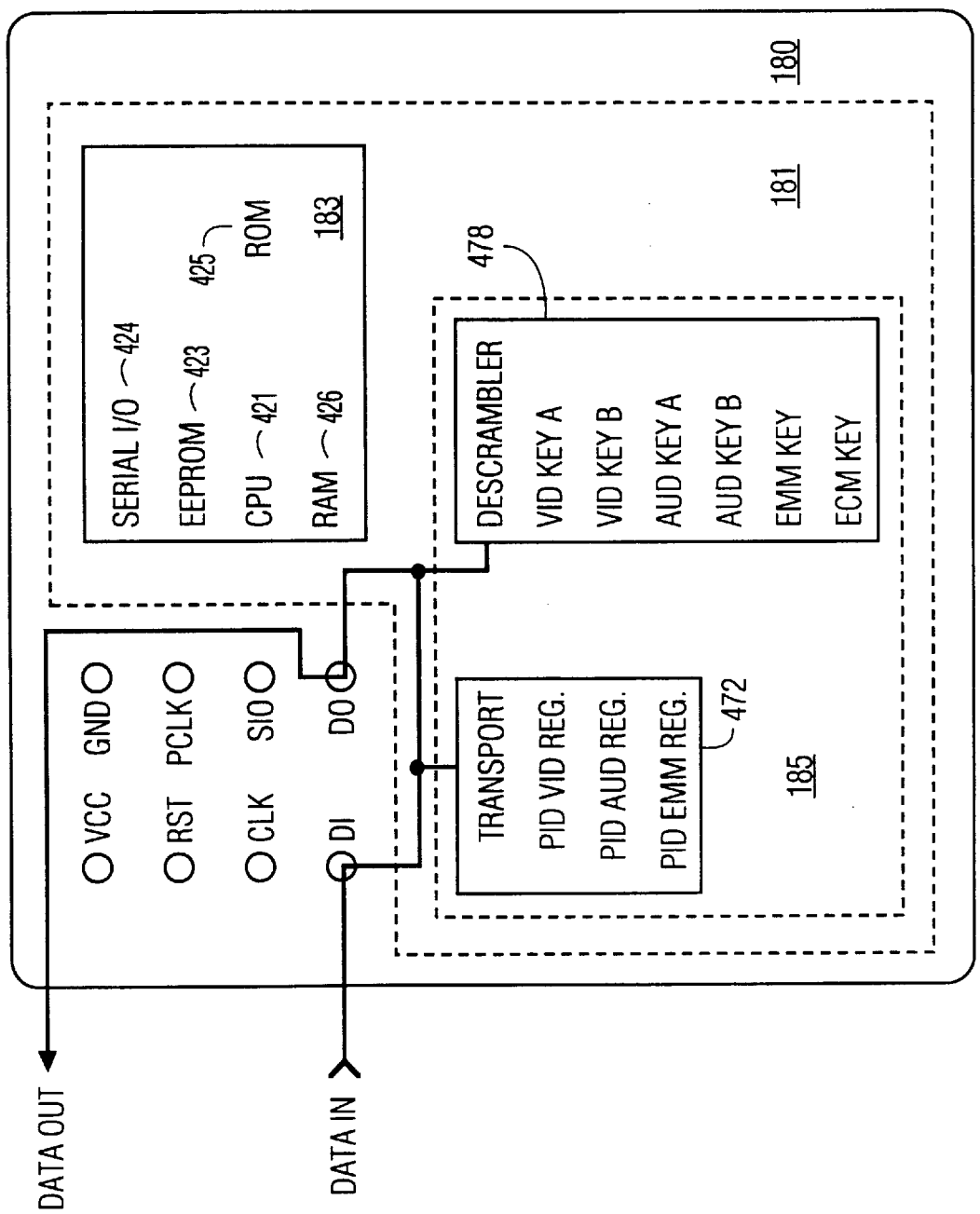

After the operations shown in FIGS. 5, 6, and 7, descrambler 478 has been initialized with all key information needed to process encrypted data in the tuned channel, including EMM, ECM, video and audio data. FIG. 8 shows the signal flow for data processing. Encrypted data enters smart card 180 via the high speed serial data input terminal. The data is decrypted in descrambler 478 using the previously loaded keys. For example, if transport unit 472 determines from the header of an incoming packet that the payload data is video data associated with video key A, the packet payload is decrypted in descrambler 478 using video key A. The decrypted data is output directly from smart card 180 via the high speed serial data output terminal. Note that data processing in FIG. 8 does not require interaction between descrambling unit 185 and security control unit 183 allowing descrambler 478 to process data at the high data rate of the input signal.

Key generation in security controller 183 combined with the descrambling features of descrambling unit 478 provides complete capability in smart card 180 for processing signals encrypted using a variety of algorithms including the data encryption standard (DES) algorithm and Rivest-Shamir-Adlemann (RSA) algorithms. By providing all access control related processing within smart card 180, security related data such as key data does not have to be transferred out of smart card 180. As a result, security is improved significantly in comparison to systems using a descrambler external to the smart card.

Although the use of descrambler 185 internal to smart card 180 is advantageous, an external descrambler such as descrambler 130 in FIG. 1 may also be used. An external descrambler may be desirable for compatibility of the described smart card with existing pay-TV systems that generate the key in smart card 180 and transfer the key to descrambler 130. Alternatively, using both descrambler 185 and descrambler 130 may be desirable. For example, security can be improved by encrypting a signal twice using two different keys. A twice-encrypted signal could be decrypted using the system shown in FIG. 1 by: decrypting the signal once in descrambler 185 using the first key, transferring the partially decoded data to descrambler 130, and decrypting the signal a second time in descrambler 130 using the second key. The second key would be generated in smart card 180 and transferred to descrambler 130.

For applications involving descrambler 130 (i.e. applications in which key data is transferred out of smart card 180), commands are provided for transferring the key data via the serial I/O interface between controller 160 and smart card 180. For example, microcontroller 160 sends ECM data to the card in one command and requests the status of key generation with a status command. When the status data indicates that key generation is complete, another command requests the key data and the card responds by sending the key data to controller 160. Subsequently, the key is transferred to descrambler 130.

Various modifications of the described embodiments are possible. For example, it will be readily apparent to one skilled in the art that the invention is applicable to signals and systems other than those described. For example, video systems and video signal protocols other than that depicted in FIG. 3 include the above-mentioned DSS® satellite system and high definition television (HDTV). The described type of access control system is also applicable to signal processing systems such as cellular telephone systems in which processing entitlements may involve determining whether a user is entitled to access a cellular telephone system and, if so, processing a scrambled cellular telephone signal.

Applications such as a cellular telephone system involve generating an outgoing signal in addition to processing an incoming signal. Generating an outgoing signal requires encryption. The described smart card can encrypt data if appropriate encryption software is stored in EEPROM and ROM in smart card 180. Thus, the invention is applicable to signal source applications such as telephone systems or "head-end" applications in cable TV systems. These and other modifications are intended to be within the scope of the following claims.

I claim:

1. A smart card comprising:
    a first terminal for receiving an input signal including first and second scrambled signal components;
    a second terminal for providing an output signal;
    means for processing said first scrambled signal component for producing a first descrambled processed signal, and being responsive to said first descrambled processed signal for processing said second scrambled signal component for producing a second descrambled processed signal; and
    means for combining said first scrambled signal component of said input signal and said second descrambled processed signal to produce said output signal.

2. The smart card of claim 1 wherein
    said means for combining said first scrambled signal component of said input signal and said second descrambled processed signal producing a predetermined timing relationship between said first scrambled signal component and said second descrambled processed signal in said output signal.

3. The smart card of claim 2 wherein
    said means for combining said first scrambled signal component of said input signal and said second descrambled processed signal comprising:
    means for delaying said first scrambled signal component to produce a delayed signal exhibiting substantially said predetermined timing relationship with respect to said second descrambled processed signal; and
    means for combining said delayed signal and said second descrambled processed signal to produce said output signal.

4. The smart card of claim 3 wherein
    said input signal exhibiting an input timing relationship between said first scrambled signal component and said scrambled second signal component; and
    said predetermined timing relationship being substantially the same as said input timing relationship.

5. The smart card of claim 4 wherein said means for delaying said first scrambled signal component of said input signal comprises a first-in-first-out memory device.

6. The smart card of claim 5 further comprising means responsive to said first descrambled signal for producing control information; said means for producing said first and second descrambled signals being responsive to said control information for producing said second descrambled signal.

7. The smart card of claim 6 wherein
    said means for producing said first and second descrambled signals, said means for producing said control information and said means for combining said first scrambled signal component and said second descrambled signal to produce said output signal being included in an IC mounted in said smart card; and
    said first and second terminals being positioned on a surface of said smart card.

8. The smart card of claim 7 further comprising a third terminal positioned on said surface of said smart card for receiving a timing signal;
    said means for producing said first and second descrambled signals being responsive to said timing signal for processing said input signal at a first data rate to produce said output signal at said first data rate.

9. The smart card of claim 8 wherein said first data rate exceeds 10 mega-Hertz.

10. The smart card of claim 8 wherein said means for producing said control information processes said first descrambled signal at a second data rate for producing said control information.

11. The smart card of claim 10 wherein said first data rate is greater than said second data rate.

12. The smart card of claim 11 further comprising a frequency divider coupled to receive said timing signal for producing a clock signal at a frequency related to said second data rate; said means for producing said control information being responsive to said clock signal for producing said control information.

13. The smart card of claim 8 wherein said first, second and third terminals being included in a plurality of terminals arranged on said surface of said smart card in accordance with ISO standard 7816-2.

14. The smart card of claim 13 wherein said smart card exhibits a mechanical characteristic in accordance with ISO standard 7816-1.

15. The smart card of claim 4 wherein
    said first scrambled signal component comprises entitlement management information for a pay-for-access service; and
    said second scrambled signal component comprises data provided by said pay-for-access service.

16. The smart card of claim 15 wherein said pay-for-access service comprises a pay-TV service; said entitlement management information comprises television programming entitlement information; and said data provided by said pay-for-access-service comprises television program data.

17. The smart card of claim 1 in combination with a signal processing apparatus for processing said output signal to generate a signal suitable for display, wherein said processing apparatus provides said first scrambled signal component and said second scrambled signal component to said smart card.

18. Signal processing apparatus comprising:
    (a) a signal processing channel for processing a digital input signal having a first scrambled signal component and a second scrambled signal component;

(b) means for coupling said input signal to a removable smart card assembly, said smart card assembly processing said first scrambled signal component for producing a first descrambled signal internal to said card assembly, said smart card assembly processing, in response to said first descrambled signal, said second scrambled signal component for producing a second descrambled signal and said smart card assembly combining said first scrambled signal component of said input signal and said second descrambled signal component to produce an output signal;

(c) means for receiving from said smart card assembly said output signal; and (d) means for processing said second descrambled signal component to generate a signal suitable for display.

19. A method for signal processing, said method comprising:

(a) receiving a digital input signal having a first scrambled signal component and a second scrambled signal component;

(b) coupling said input signal to a removable smart card assembly for processing said first scrambled signal component to produce a first descrambled signal internal to said smart card assembly, and for processing, in response to said first descrambled signal, said second scrambled signal component for producing a second descrambled signal and for combining said first scrambled signal component of said input signal and said second descrambled signal component to produce an output signal;

(c) receiving from said smart card assembly said output signal; and (d) processing said second descrambled signal component to generate a signal suitable for display.

* * * * *

UNITED STATES PATENT AND TRADEMARK OFFICE
CERTIFICATE OF CORRECTION

PATENT NO. : 5,852,290
DATED : December 22, 1998
INVENTOR(S) : JOHN WILLIAM CHANEY IT IS CERTIFIED THAT AN ERROR APPEARS IN THE ABOVE-IDENTIFIED PATENT AND THAT SAID LETTERS PATENT IS HEREBY CORRECTED AS SHOWN BELOW

CLAIM - 4   LINE - 4

DELETE... [scrambled second]

INSERT... "second scrambled"

Signed and Sealed this

Twenty-second Day of May, 2001

Attest:

NICHOLAS P. GODICI

Attesting Officer    Acting Director of the United States Patent and Trademark Office